United States Patent
Solh

(10) Patent No.: US 9,915,528 B1
(45) Date of Patent: Mar. 13, 2018

(54) OBJECT CONCEALMENT BY INVERSE TIME OF FLIGHT

(71) Applicant: Amazon Technologies, Inc., Reno, NV (US)

(72) Inventor: Mashhour Solh, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 638 days.

(21) Appl. No.: 14/458,746

(22) Filed: Aug. 13, 2014

(51) Int. Cl.
*G01C 3/08* (2006.01)

(52) U.S. Cl.
CPC ..................................... *G01C 3/08* (2013.01)

(58) Field of Classification Search
CPC ................. G01S 3/14; G01S 3/46; G01S 7/38
See application file for complete search history.

(56) References Cited

U.S. PATENT DOCUMENTS 6,297,762 B1 * 10/2001 Labitt ...................... G01S 3/46
342/13

* cited by examiner

*Primary Examiner* — Luke D Ratcliffe
(74) *Attorney, Agent, or Firm* — Lee & Hayes, PLLC

(57) ABSTRACT

A first device may emit a first modulated signal within an environment that includes a second device that is located close in proximity to an object. The second device may capture the first modulated signal and determine a second modulated signal having a phase that is different from that of the first modulated signal. In response to capturing the second modulated signal, the first device may determine a phase difference corresponding to the first modulated signal and the second modulated signal using time-of-flight (TOF). Using the phase difference, the first device may determine the distance between the first device and the object. In embodiments where the phase difference is zero, the first device may be unable to detect the presence of the object.

20 Claims, 10 Drawing Sheets

OBJECT CONCEALMENT BY INVERSE TIME OF FLIGHT

BACKGROUND

A distance between objects can be measured by emitting light and measuring a time-of-flight (TOF) of the light between the objects. Traditional measurement of light using TOF uses light and calculates a distance based on the amount of time between the emission of the light and a time when the light is captured at a sensor. Typically, the sensor is located near a light emitter that emits the light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
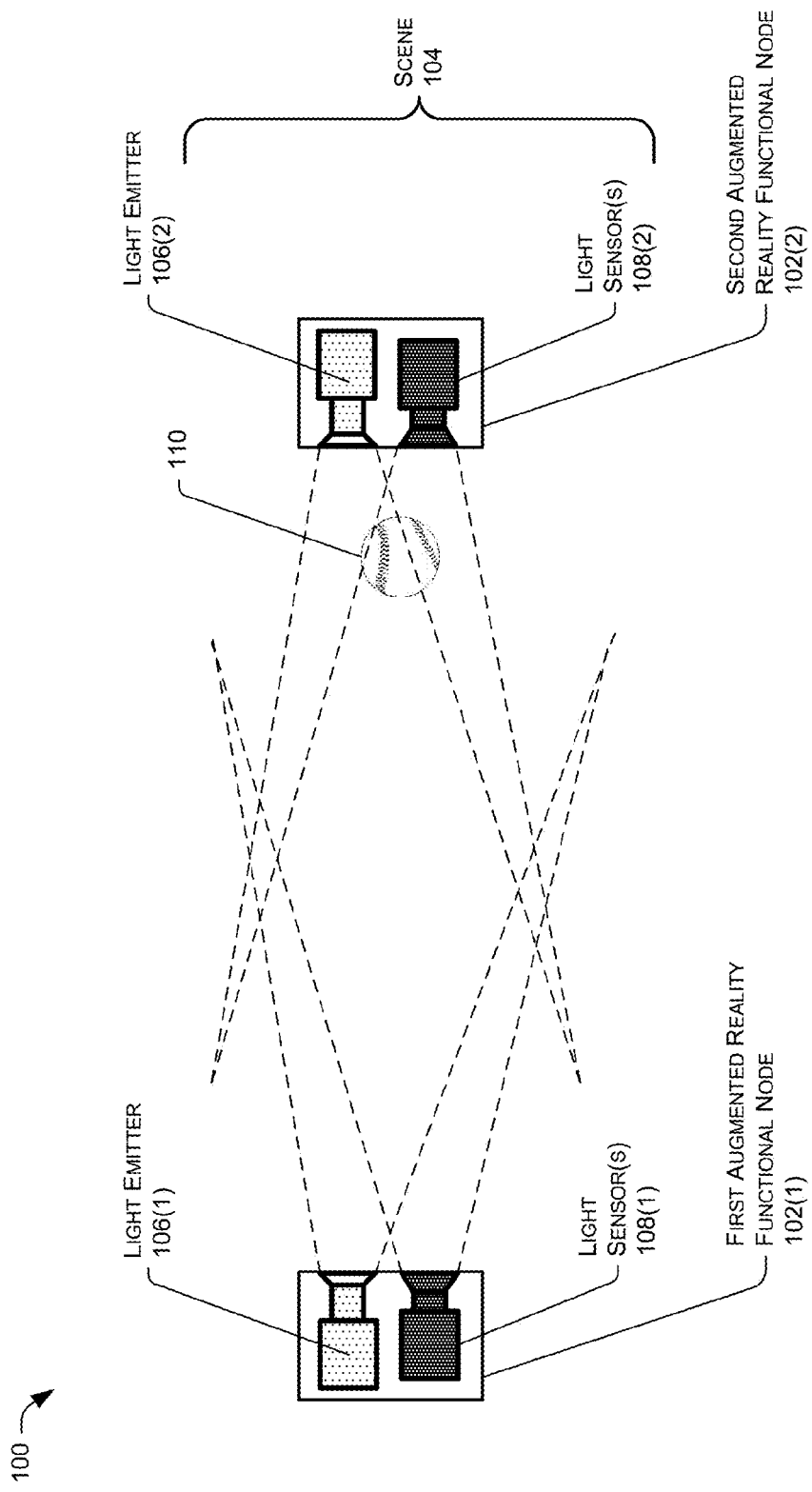
FIG. 1 is an illustrative diagram of a first ARFN detecting objects within a scene, while a second ARFN prevents the first ARFN from detecting a particular one of the objects within the scene.

Described herein are systems and techniques to determine a distance or depth of objects within an augmented reality environment using time-of-flight (TOF) and a modulated signal (e.g., a light signal), while also causing the distance or depth of one or more objects within the environment to be concealed to a device within the environment. More particularly, a first augmented reality functional node (ARFN) within the environment may emit one or more light signals, where the light signals and corresponding intervals between the light signals may be substantially equal in length of time and be graphically represented by a square wave. However, other pulses patterns may be employed that do not include equal lengths of time (e.g., emit light for 0.25 μs every 1 μs, etc.). An object in close proximity to the second ARFN may cause the light signal(s) to be reflected back towards the first ARFN. Moreover, at least one light sensor of a second ARFN within the environment may detect, sense, or capture light from the light signal(s) being emitted by the first ARFN.

Upon sensing the light signal(s) emitted by the first ARFN, the second ARFN may determine the phase of the light signal(s) based on an amount of light captured at different time intervals during a cycle of the frequency of the light signal(s). In accordance with various embodiments, a distance between the at least one light sensor of the second ARFN and one or more light emitters of the first ARFN may be calculated using a ratio representative of the phase difference. The distance may be within a distance range defined by a distance of light travel during a modulation period (cycle) of that frequency. The distance may be based at least in part on the ratio defined by an amount of light captured during a first time interval and a second time interval, and a comparison of an amount of the reflected light captured during at least a third time interval. The first, second, and third time intervals are different, but may overlap in some instances.

In view of the determined phase, the second ARFN may determine and emit a second modulated signal directed towards the first ARFN. The second modulated signal may have the same frequency as that of the modulated signal emitted by the light emitter(s) of the first ARFN, but the phase of the second modulated signal may be shifted or offset with respect to the modulated signal. For instance, the phase of the second modulated signal may be shifted one-hundred and eighty degrees with respect to the phase of the modulated signal. Upon one or more light sensors of the first ARFN detecting or capturing the second modulated signal, the first ARFN may determine a phase difference corresponding to the modulated signal emitted by the first ARFN and the second modulated signal emitted by the second ARFN. Since the second modulated signal may be phase shifted, thereby causing the two modulated signals to be offset, the phase difference determined by the first ARFN may be zero. As a result, although the object in proximity to (e.g., in the same plan as) the second ARFN is physically present within the environment, the first ARFN may be unable to detect its presence and determine the depth of the object.

In various embodiments, provided that an augmented reality environment includes one or more physical objects and multiple ARFNs, and that a first one of the ARFNs is attempting to determine the presence and location of objects within the environment, the first ARFN may emit a modulated signal within the environment. By placing a second one of the ARFNs in close proximity to one of the objects, and by the second ARFN emitting a second modulated signal that has a phase that is shifted one-hundred and eighty degrees with respect to the modulated signal emitted by the first ARFN, the phase difference may be zero and the system may cause the object to be hidden from view with respect to the first ARFN. As a result, a depth map of the environment (e.g., scene) may include the presence and location/depth of certain objects, while excluding the presence of other objects physically located in the environment.

In other embodiments, and as described in additional detail below, the multiple ARFNs may cause virtual objects to be included in the environment at particular locations within the environment. In addition, the systems and methods described herein may serve to reduce the amount of interference between multiple TOF devices operating within the same environment.

The systems and techniques described herein may be implemented in a number of ways. Example implementations are provided below with reference to the following figures.

FIG. 1 is an illustrative system 100 that includes multiple ARFNs 102 that are each configured to use TOF to determine the depth of a scene 104, including the depth of objects within the scene 104. As shown in FIG. 1, the system 100 may include any number of ARFNs 102 (e.g., two ARFNs 102), such as a first ARFN 102(1) that includes one or more light emitters 106(1) and one or more light sensors 108(1), and a second ARFN 102(2) that includes one or more light emitters 106(2) and one or more light sensors 108(2). In addition, the scene 104 may include one or more objects (e.g., object 110), which is shown as a baseball in FIG. 1. For the purposes of this discussion, the light emitter(s) 106 of the ARFN 102 may include any functionality that allows the ARFN to emit signals having a frequency range from visible light to non-visible light, such as infrared (IR). Moreover, the light sensor(s) 108 of the ARFN 102 may include any functionality that allows the ARFN 102 to receive, sense, or capture emitted signals.

Typically, a TOF device may determine a depth map of a scene 104 by a light source of the TOF device initially emitting a modulated signal (e.g., modulated light) having a particular frequency or amplitude within the scene 104. The emitted modulated signal may travel within the scene 104 and hit one or more objects, which may cause the emitted modulated signal to reflect back to the TOF device. A sensor of the TOF device may then measure or capture the reflected modulated signal. Subsequently, the TOF device may determine a phase difference between the emitted modulated signal and the reflected modulated signal by correlating the emitted modulated signal and the reflected modulated signal. Since the relation between the phase difference and the distance between the TOF device and the object is linear, the TOF device (or another device) may utilize the phase difference to determine the depth of the object within the scene 104.

However, in some instances, the depth of each object within the scene 104, or the depth of various areas of the scene 104, may not be of interest. That is, one may only want to determine the depth of objects in the foreground of the scene 104 (e.g., objects in closer proximity to the device), without detecting and determining the depth of objects in the background of the scene 104 (e.g., objects farther in distance from the device), and vice versa. In other embodiments, one may want to determine the depth of an object at a particular location in the scene 104, but may not want to detect one or more objects that are also physically located at or near that particular location. In other words, a user may want to detect and determine the depth of certain objects within the scene 104 (e.g., a table), but not other objects that are also currently present within the scene 104 (e.g., a potted plant located on top of the table).

Here, the first ARFN 102(1) may attempt to detect the presence and location of objects within the scene 104, which includes the object 110 (e.g., a baseball). The second ARFN 102(2) may be situated in close proximity to the object 110, such as at the same location as the object 110, or in any location surrounding the location of the object 110 (e.g., above, below, in front of, behind, to the left, to the right, etc.). For instance, the second ARFN 102(2) may be physically located in the same plane as the object 110, or may be positioned a particular distance behind the object 110, such that the object 110 is located between the first ARFN 102(1) and the second ARFN 102(2). Provided that the second ARFN 102(2) is positioned in the same plane as the object 110, the distance between the second ARFN 102(2) and the first ARFN 102(1) and the distance between the object 110 and the first ARFN 102(1) may be equal, or approximately equal.

When the light emitter 106(1) of the first ARFN 102(1) emits a first modulated signal (e.g., a first light signal) having a particular frequency/amplitude within the scene 104, the light sensor 108(2) of the second ARFN 102(2) may capture the first modulated signal. The second ARFN 102(2) may then measure the phase corresponding to the first modulated signal emitted by the first ARFN 102(1), where the phase may correspond to the fraction of the wave cycle of the first modulated signal which has elapsed relative to its origin (e.g., the light emitter 106(1) of the first ARFN 102(1)). The second ARFN 102(2) may then determine a second modulated signal (e.g., a second light signal) having a phase that is offset with respect to the phase of the first modulated signal, where the phase of the second modulated signal is offset one-hundred and eighty degrees with respect to the phase of the first modulated signal. The second modulated signal may have the same frequency/amplitude as the first modulated signal. The light emitter 106(2) of the second ARFN 102(2) may then emit the second modulated signal having the offset phase towards the first ARFN 102(1).

In some embodiments, prior to the first ARFN 102(1) emitting the first modulated signal, the first ARFN 102(1) and the second ARFN 102(2) may be calibrated and/or synchronized. By doing so, the ARFNs 102 within the scene may be aware of their own physical location within the scene 104, and may also be aware of the physical location of the other ARFNs 102 within the scene 104. As a result, the second ARFN 102(2) may be aware of the distance between the first ARFN 102(1) and the second ARFN 102(2), and vice versa. In addition, the second ARFN 102(2) may be aware of the frequency and/or the phase of the first modulated signal that is to be emitted by the first ARFN 102(1), before the first modulated signal is emitted. As a result, upon receiving the first modulated signal, the second ARFN 102(2) may not have to determine the distance between the ARFNs 102, the frequency of the first modulated signal, and/or the phase of the first modulated signal.

In other embodiments, the ARFNs 102 may be unaware of the physical locations of other ARFNs 102 within the scene 104. As discussed in additional detail herein, each of the ARFNs 102 may perform TOF calculations to determine the distance between the ARFNs 102. That is, the first ARFN 102(1) may emit a signal directed towards the second ARFN 102(2) and then capture the signal as it is reflected back from the second ARFN 102(2). The first ARFN 102(1) may then determine the phase difference with respect to the emitted signal and the reflected signal, which may indicate the distance from the first ARFN 102(1) and the second ARFN 102(2). Similarly, the second ARFN 102(2) may perform a similar process to determine the distance between the second ARFN 102(2) and the first ARFN 102(1). Moreover, upon receiving the first modulated signal from the first ARFN 102(1), the second ARFN 102(2) may analyze the first modulated signal to determine the frequency and/or phase of the first modulated signal.

After the light sensor 108(1) of the first ARFN 102(1) captures the second modulated signal emitted by the second ARFN 102(2), the first ARFN 102(1) measures a phase difference corresponding to the first modulated signal emitted by the first ARFN 102(1) and the second modulated signal emitted by the second ARFN 102(2). The phase difference may correspond to the difference, expressed in electrical degrees or time, between two waves (e.g., the first modulated light and the second modulated light) having the same frequency and referenced to the same point in time. The second ARFN 102(2), or a device in communication with the second ARFN 102(2), may select the offset of the phase of the second modulated signal (e.g., offset one-hundred and eighty degrees from the phase of the first modulated signal) such that the phase difference determined by the first ARFN 102(1) is zero. Since the phases of the first modulated signal and the second modulated signal may be offset one-hundred and eighty degrees, the second modulated signal may effectively cancel the first modulated signal. As a result, the phase difference between the first modulated signal and the second modulated signal may be zero. The first ARFN 102(1) may then be unable to detect the presence and location of the object 104, and the second ARFN 102(2) may be configured to conceal the presence of the object 104 with respect to the first ARFN 102(1). A user may place the second ARFN 102(2) in various locations within the scene 104 (e.g., in the same plane as objects within the scene 104) for the purpose of concealing the presence of these objects.

Figure 2:
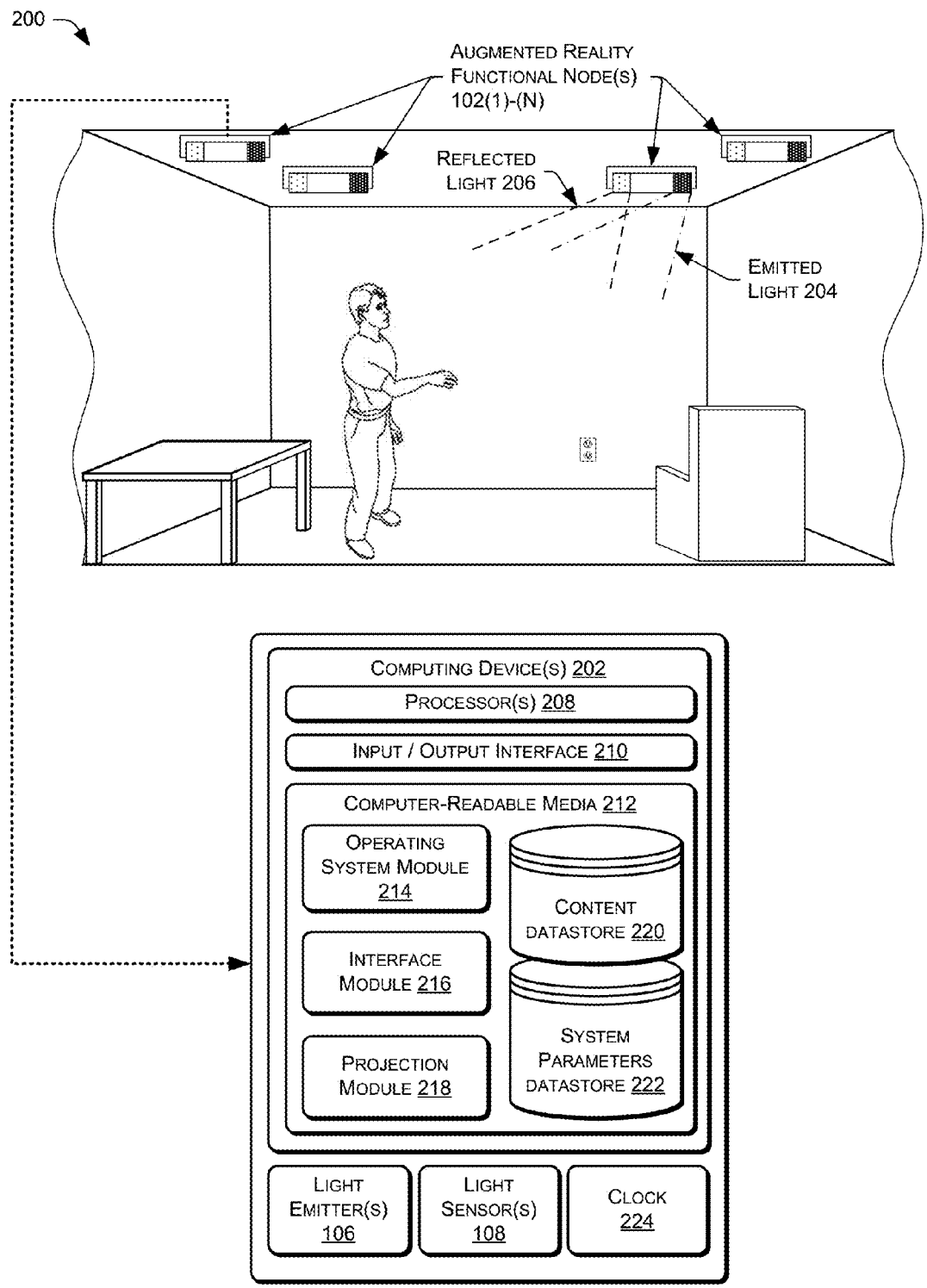
FIG. 2 illustrates an environment that includes multiple augmented reality functional nodes (ARFNs) and a user that may interact with the ARFNs.

FIG. 2 shows an illustrative augmented reality environment 200 in which the described techniques may be performed. The environment 200 includes one or more ARFNs 102(1), . . . , 102(N) (collectively referred to as "the ARFN 102" in some instances). While the environment 200 illustrates four nodes, in some instances an environment 200 may include any number of one or more nodes stationed in different locations throughout the environment 200. Furthermore, it is to be appreciated that the techniques described herein may be performed by a single ARFN 102, by a collection of any number of ARFNs 102, or by any other devices or combinations of devices.

As illustrated, each ARFN 102 may include one or more computing devices 202, as well as one or more light emitters 106 that, when active, emit a modulated signal, such as light signals, onto any object or surface within the environment 200.

In some embodiments, the light emitter(s) 106 may include one or more projectors that project content onto any object or surface. The projected content may include electronic books, videos, images, interactive menus, or any other sort of visual content.

For instance, a user within the environment 200 may request that the ARFN 102 project a particular electronic book that the user wishes to read. In response, the ARFN 102 may project the book onto a projection surface within the environment 200. In another example, the user may request that the ARFN 102 project a particular movie or video that the user wishes to watch. In response, the ARFN 102 may obtain the content (locally or remotely) and may project the content onto an object or surface in the environment 200. In yet another example, the ARFN 102 may be configured to project a user interface (UI), such as a keyboard, a slider bar, a virtual remote control to operate a television within the environment 200, or any other type of UI.

As discussed in further detail below, the ARFN 102 may include one or more light sensor(s) 108 that may capture signals or light that is emitted from the light emitter(s) 106 and/or that is reflected off an object or surface.

In some embodiments, the light sensor(s) 108 may be used to determine movement of objects or surfaces, such as movement of a user operating the UI. In response, the ARFN 102 may provide feedback to the user and/or may cause performance of actions corresponding to the user's operation of the UI. For instance, when the ARFN 102 projects a remote control, the ARFN 102 may provide feedback to the user indicating which button(s) a user is in position to select, may identify a user's selection (e.g., a selection to power on the television) and, in response, may operate the television according to an identified selection. While a few examples have been given, it is to be appreciated that the ARFN 102 may project any other sort of content within the environment 200. In addition, the ARFN 102 may recognize and interpret gestures that are made by the user without reference to a UI projected within the environment 200. In addition, the ARFN 102 may recognize and interpret gestures that are made by the user, and based on the gestures, generate a UI (e.g., a virtual UI) projected within the environment 200.

In this example, one of the ARFNs 102 within the environment 200 is shown to provide emitted light 204 as a modulated signal. In addition, the ARFN 102 may capture emitted light 204 emitted from other ARFNs 102 within the environment 200 or reflected light 206 within the environment 200 for the purpose of identifying distances between the ARFN 102 and an object or surface that reflects the light, or between the ARFN 102 and a different ARFN 102 within the environment 200.

While FIG. 2 illustrates one ARFN 102 emitting the emitted light 204 and receiving the reflected light 206, in some implementations, one or more other ARFNs 102 may additionally or alternatively perform one or both of these functions. In either instance, by scanning the environment 200 in this manner, the ARFNs 102 may identify the location (e.g., distances) of objects within the environment 200 and movement of the objects. In some instances, the objects may be people and the movements may be gestures performed by people within the environment 200. Such gestures may be interpreted as instructions or commands to be implemented by the ARFNs 102.

As illustrated, the computing device 202 of the example ARFN 102 includes one or more processors 208, an input/output interface 210, and computer-readable media 212. The processors 208 may be configured to execute instructions, which may be stored in the computer-readable media 212 or in other computer-readable media accessible to the processors 208.

Figure 3:
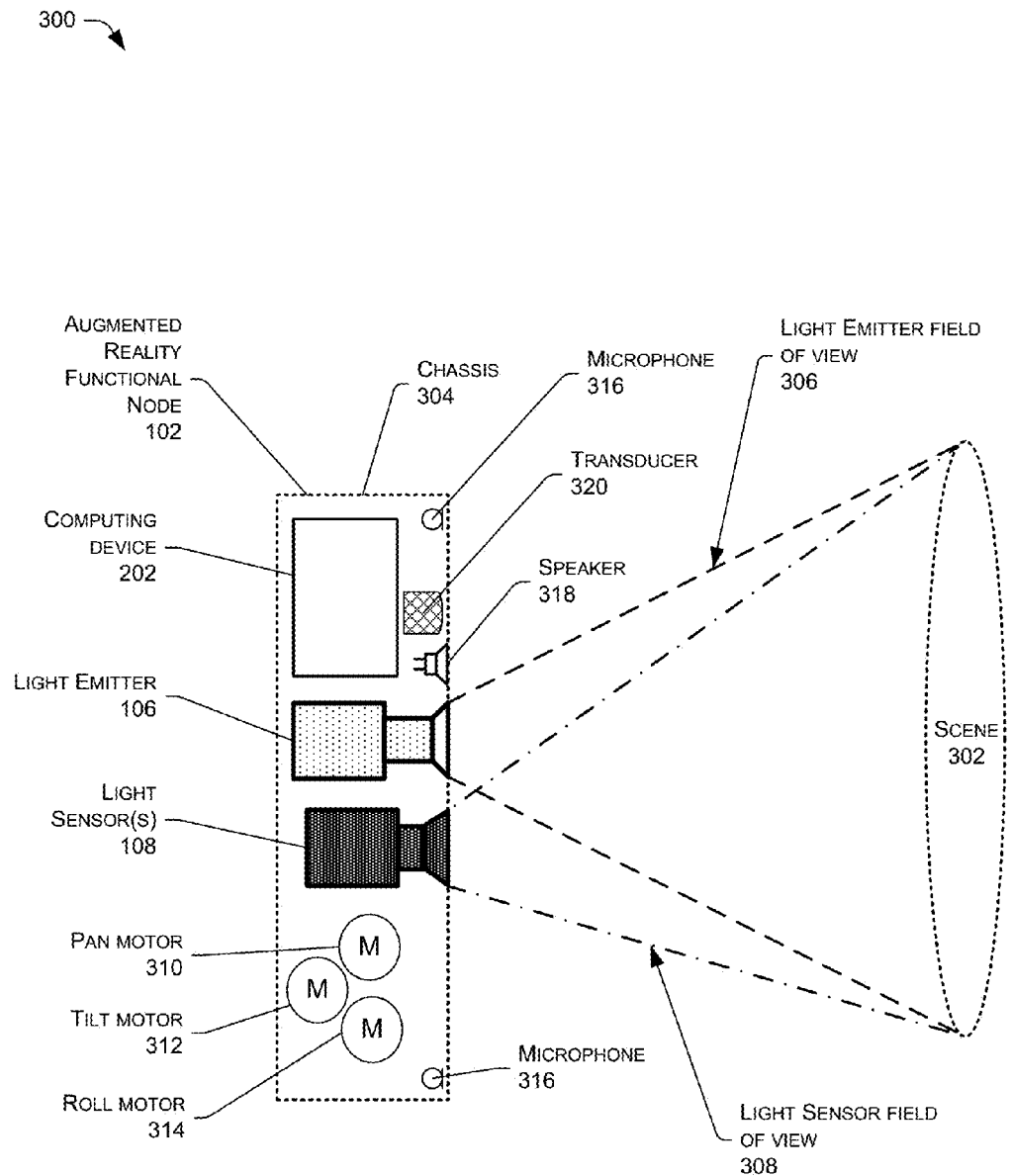
FIG. 3 illustrates an example ARFN that includes a computing device, a light emitter, light sensor(s), and other selected components for allowing multiple ARFNs to interact with objects within an environment and with one another.

The input/output interface 210, meanwhile, may be configured to couple the computing device 202 to other components of the ARFN 102, such as the light emitter(s) 106, the light sensor(s) 108, microphones, other ARFNs 102, other computing devices, and so forth. The coupling between the computing device 202 and the devices may be via wire, fiber optic cable, wireless connection, or the like. Furthermore, while FIG. 1 illustrates the computing device 202 as residing within a housing of the ARFN 102, some or all of the components of the computing device 202 may reside at another location that is operatively connected to the ARFN 102. In still other instances, certain components, logic, and/or the like of the computing device 202 may reside within the light emitter 106 or the light sensor 108. Therefore, it is to be appreciated that the illustration of the ARFN 102 of both FIGS. 2 and 3 is for illustrative purposes only, and that components of the ARFN 102 may be configured in any other combination and at any other location.

The computer-readable media 212, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 202. The computer-readable media 212 may reside within a housing of the ARFN 102, on one or more storage devices accessible on a local network, on cloud storage accessible via a wide area network, or in any other accessible location.

The computer-readable media 212 may store several modules, such as instructions, datastores, and so forth that are configured to execute on the processors 208. For instance, the computer-readable media 212 may store an operating system module 214, an interface module 216, a projection module 218, a content datastore 220, and a system parameters datastore 222.

The operating system module 214 may be configured to manage hardware and services within and coupled to the computing device 202 for the benefit of other modules. The interface module 216, meanwhile, may be configured to receive and interpret commands received from users within the environment 200. For instance, the interface module 216 may analyze and parse data captured by the light sensors 108 to identify hand gestures made by users within the environment 200. In response to identifying a predefined gesture, the interface module 216 may interpret the gesture and cause the ARFN 102 to perform a corresponding action.

For instance, if a user within the environment 200 makes a gesture requesting that the ARFN 102 project a certain piece of content, then the interface module 216 may interpret the gesture and cause the projection module 218 to project the content via the light emitter(s) 106.

The content datastore 220, meanwhile, stores content for outputting within the environment 200. For instance, the content datastore 220 may store applications and data for use within the environment 200. The projection module 218 may access the content datastore 220 in order to project requested content within the environment 200. For instance, when the user requests that the ARFN 102 project a particular electronic book, the projection module 218 may access the content datastore 220 to retrieve and cause projection of the desired electronic book.

The computer-readable media 212 may store the system parameters datastore 222, which is configured to maintain information about the state of the computing device 202, the light emitter(s) 106, the light sensor(s) 108, and so forth. For example, and as described in detail below, the ARFN 102 may be configured to pan and tilt for the purpose of allowing the light emitter(s) 106 and the light sensor(s) 108 to access different objects and projection surfaces in the environment 200. As such, the system parameters maintained in the system parameters datastore 222 may include current pan and tilt settings of the camera and projector, an indication of content that the ARFN 102 is currently projecting or otherwise outputting, and the like.

The system parameter datastore 222 (or another datastore) may further store a library of reference gestures that may be used to interpret user gestures. As illustrated, the user in the room may make gestures with his body, such as hand motions, that can be captured by the cameras. The computing device 202 identifies motion parameters corresponding to the observed gesture. The motion parameters are compared to those of the gesture library. The device then classifies the observed gesture based on the comparison.

In some embodiments, the computing device 202 may include a clock 224 to generate a clock cycle. The clock cycle may be used by the light emitter(s) 106 and/or the light sensor(s) 108 to control operation of the respective ARFNs 102 during TOF of light measurements, as discussed in greater detail below. In some instances, the clock 224 may be integrated with the processor(s) 208, one or more of the light emitter(s), 106, or another device.

As stated above, an ARFN 102 may detect objects within the environment, and also may determine a corresponding depth of those objects (e.g., a distance from the ARFN 102 to the object). As a result, the ARFNs 102 may create a depth map of the environment 200, which may identify the location of objects within the environment 200. However, in other embodiments, the ARFNs 102 may cause at least one of the objects within the environment 200 to be hidden from view with respect to a different ARFN 102, although that object is still physically present within the environment 200. That is, by placing one of the ARFNs 102 in close proximity to that object, the ARFN 102 may prevent a different ARFN 102 from detecting that object within the environment 200.

More particularly, in response to a first ARFN 102 projecting emitted light 204 within the environment 200, a second ARFN 102 physically located in the same plane as the object may detect or capture the emitted light 204. Instead of the first ARFN 102 capturing the reflected light 206 that is reflected from the object, the second ARFN 102 may determine the frequency and/or phase of the emitted light 204 and then emit a modulated signal that has an adjusted phase, such that the phase of the emitted light 204 and the adjusted phase of the modulated signal may be offset one-hundred and eighty degrees. The second ARFN 102 may then emit the modulated signal towards the first ARFN 102. The first ARFN 102 may detect or capture the modulated signal having the adjusted phase and then determine a phase difference with respect to the emitted light 204 and the modulated signal. Since the phase of the modulated signal may be offset one-hundred and eighty degrees with respect to the phase of the emitted light 204 emitted by the first ARFN 102, the phase difference determined by the first ARFN 102 may be zero. As a result, the first ARFN 102 may be unable to detect the presence and location of that object, even thought that object is currently physically located in the environment 200. That is, by situating the second ARFN 102 in the same plane as the object, the second ARFN 102 may be able to hide or conceal the object from the first ARFN 102.

FIG. 3 is a diagram 300 that shows additional details of an example ARFN 102 that may be configured to measure distances of objects or surfaces, identify movement of the surfaces (or objects), project a user interface (UI), to identify and respond to user gestures, and/or to conceal objects within an environment, as described above with reference to FIGS. 1 and 2. The ARFN 102 is configured to scan at least a portion of a scene 302 and the objects therein. The ARFN 102 may also be configured to provide output, such as images, sounds, and so forth.

A chassis 304 holds the components of the ARFN 102. One or more light emitters 106 may be disposed within the chassis 304 and may be configured to generate and project light and/or images into the scene 302. The light may include visible light, non-visible light, or both. The images may be visible light images perceptible to the user, visible light images imperceptible to the user, images with non-visible light, or a combination thereof. The light emitter 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The light emitter 106 may have a light emitter field of view 306 which describes a particular solid angle. The light emitter field of view 306 may vary according to changes in the configuration of the light emitter 106. For example, the light emitter field of view 306 may narrow upon application of an optical zoom to the light emitter 106. The light emitter field of view 306 may result in emission of light over a small surface area or a larger surface area.

One or more light sensors 108 may also be disposed within the chassis 304. The light sensors 108 are configured to receive light emitted by the light emitter 106 and reflected off a surface in the scene 302, or light emitted by a light emitter 106 of a different ARFN 102. Thus, the light sensors 108 receive light and/or reflected light. The light sensors 108 have a light sensor field of view 308 that describes a particular solid angle. The light sensor field of view 308 may vary according to changes in the configuration of the light sensor(s) 108. For example, an optical lens included with one of the light sensors 108 may narrow the light sensor field of view 308. The light sensor field of view 308 may result in capture of light from a small surface area or a larger surface area, and may align with the light emitter field of view 306.

In some implementations, a plurality of light sensors 108 may be used where each light sensor 108 includes a photodiode and a storage element. In some embodiments, a light sensor 108 may be equipped a photodiode that is shared by a plurality of storage elements, which each store energy during intervals of time. The storage elements may be any electronic/semiconductor device structures that can store energy as a charge. Examples include, without limitation, capacitors and charge-coupled devices. These storage elements may be used to create data that indicates a distance of an object or surface in the scene 302, as explained in further detail below regarding discussion of TOF of light.

The chassis 304 may be mounted with a fixed orientation, or may be coupled via an actuator to a fixture such that the chassis 304 may move. Actuators may include piezoelectric actuators, motors, linear actuators, and other devices configured to displace or move the chassis 304 or components therein such as the light emitter(s) 106 and/or the light sensor(s) 108. For example, in one implementation the actuator may comprise a pan motor 310, a tilt motor 312, a roll motor 314, and so forth. The pan motor 310 is configured to rotate the chassis 304 in a yawing motion. The tilt motor 312, meanwhile, is configured to change the pitch of the chassis 304. The roll motor 314 is configured to move the chassis 304 in a rolling motion. By panning, tilting, and/or rolling the chassis 304, different views of the scene 302 may be acquired.

One or more microphones 316 may be disposed within the chassis 304, or elsewhere within the scene 302. These microphones 316 may be used to acquire input from the user, may be used to determine the location of a sound, or may be used to otherwise aid in the characterization of and receipt of input from the scene 302. For example, the user may make a particular noise, such as a tap on a wall or snap of the fingers, which are pre-designated as attention command inputs. The user may alternatively use voice commands. Such audio inputs may be located within the scene 302 using time-of-arrival differences among the microphones 316 and used to summon an active zone within the augmented reality environment.

One or more speakers 318 may also be present to provide for audible output. For example, the speakers 318 may be used to provide output from a text-to-speech module or to playback pre-recorded audio.

A transducer 320 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

In this illustration, the computing device 202 is shown within the chassis 304. However, in other implementations all or a portion of the computing device 202 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 200. As mentioned above, microphones 316 and speakers 318 may be distributed throughout the scene 302. The light emitter 106 and the light sensor 108 may also be located in separate chasses 304. The ARFN 102 may also include discrete portable signaling devices used by users to issue command attention inputs. For example, these may be acoustic clickers (audible or ultrasonic), electronic signaling devices such as IR emitters, radio transmitters, and so forth.

Figure 4:
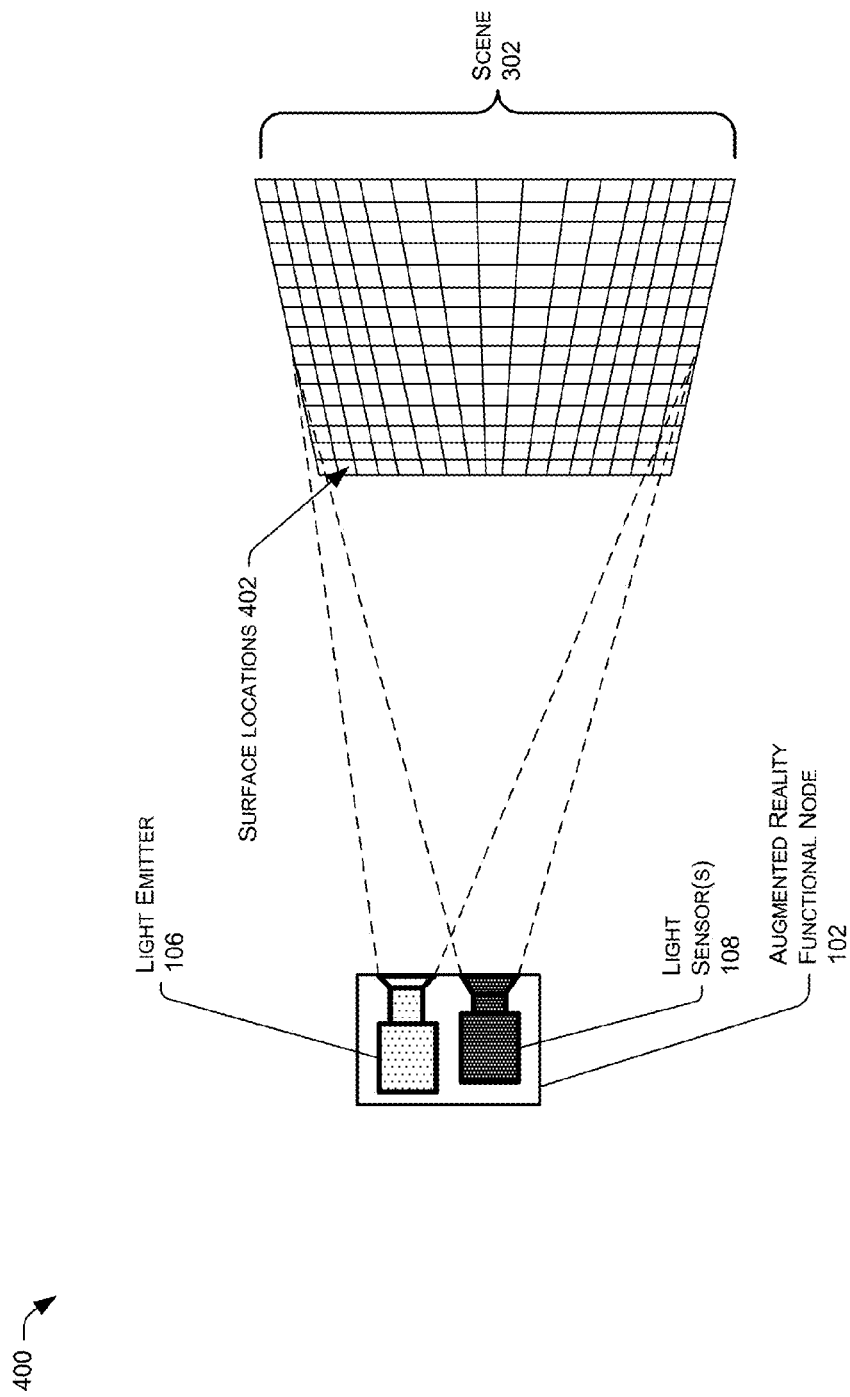
FIG. 4 is an illustrative diagram of the ARFN using a light emitter and time-of-flight (TOF) light sensors to identify surfaces, objects, and other ARFNs within an environment. By placing multiple ARFNs within the environment, the depth of certain objects may be determined, while the presence and depth of other objects may not be apparent to at least one of the ARFNs.

FIG. 4 is an illustrative diagram 400 of the ARFN 102 using TOF information to determine location and distance information regarding users, user hands, and other objects within an environment. However, while the techniques described herein provide one example for obtaining distance information regarding these objects, it is to be appreciated that distance information may be determined in other manners in other embodiments. In addition, the distance information may be used to determine three-dimensional (3D) information about objects, and may be used to create a depth map of a scene 302.

In the instant illustration, the light emitter 106 emits one or more signals (e.g., modulated light signals) onto the scene 302. The pulses of light may be synchronized with a clock cycle from the clock 224 and include intervals of "on" and "off", which can be represented by a square wave. The pulses of light may be emitted in wavelengths that are visible to the user, non-visible to the user, or a combination thereof.

The light sensors 108 may be used to receive the emitted light 204 after the light is reflected off objects or surfaces in the scene 302. In other embodiments, the light sensors 108 may be configured to receive light emitted from other ARFNs 102 within an environment. The light sensors 108 may measure the emitted light 204 and/or the reflected light 206 at specific surface locations 402 to determine a distance of objects or surfaces in the scene 302. For example, a pair of sensors may be used to measure the distance of a surface of a plurality of surface locations 402 that reflect light. The surface locations 402 may be mapped over a wall, over objects (including people, other ARFNs 102, etc.), or over any other surface included in an environment. The light sensors 108 may include elements to store measured light for each of the surface locations 402. Thus, the light sensors 108 may store a pixilated view of the surface locations 402, which may later be used to reproduce information about the scene 302.

The surface locations 402 may be represented as a grid for ease of illustration, and not as a limitation. In other implementations, other patterns, such as bars, dots, and so forth may be used. For example, the scene 302 may be analyzed as the plurality of surface locations 402 in a grid of [A×B] size, where the number of surface locations 402 is the product of A and B. For example, if the grid is [320×240], then the number of surface locations 402 is 76,800. Thus, in the example above, each of the 76,800 surface locations 402 may be sensed by respective pairs of light sensors, thus 153,600 light sensors may be used in this example when two light sensors are used for each surface location. Other quantities of light sensors may also be used. The light sensors 108 may be formed on one or more silicon chips. For example, the light sensors 108 may be implemented as capacitors that store energy associated with an amount of light received from a respective surface location during a predetermined amount of time.

Figure 5:
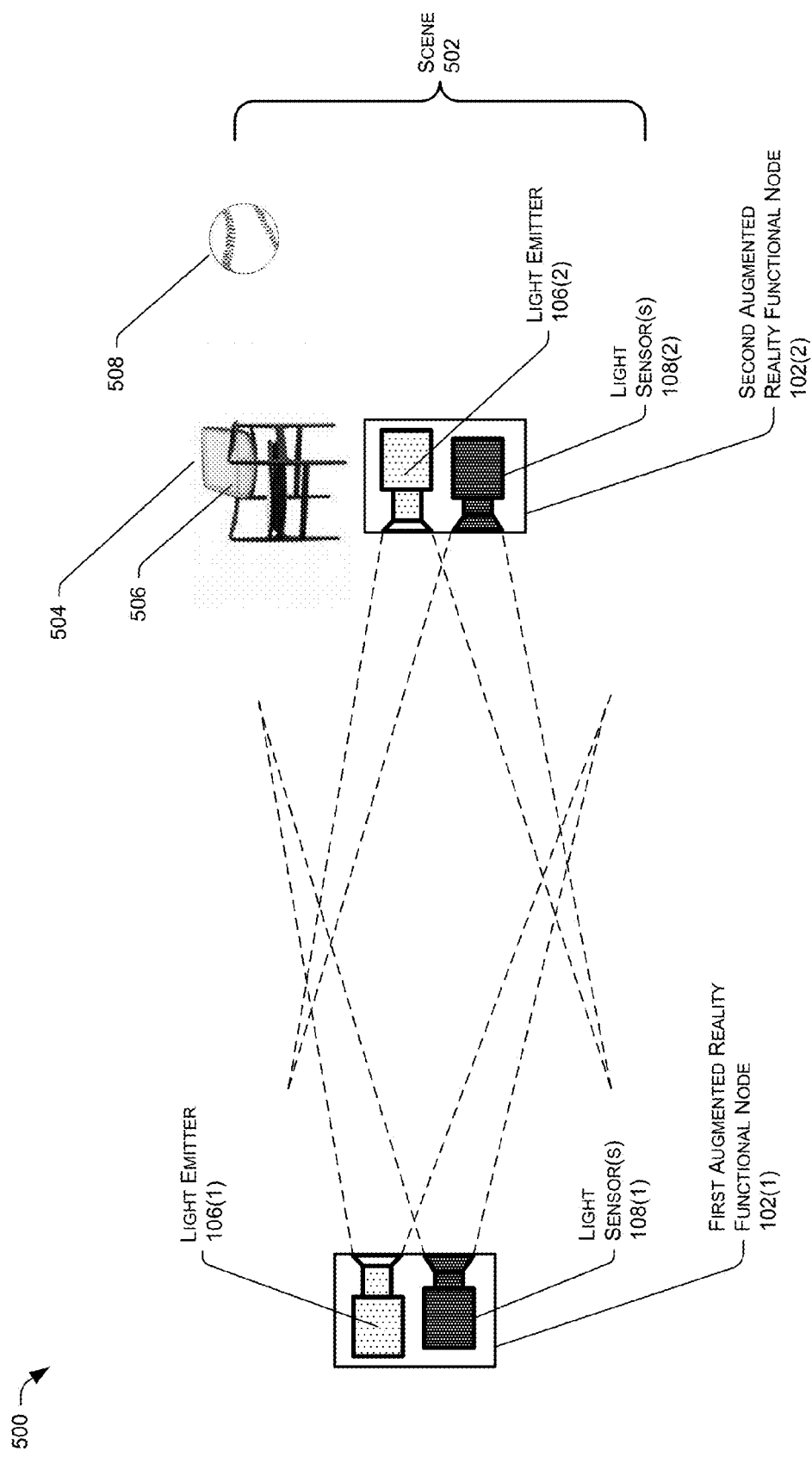
FIG. 5 is an illustrative diagram of a first ARFN detecting certain objects within a scene, while a second ARFN prevents the first ARFN from detecting a different object within the scene.

FIG. 5 is an illustrative system 500 that includes multiple ARFNs 102 that are each configured to use TOF to determine the depth of a scene 502, including the depth of objects within the scene 502. As shown in FIG. 5, the system 500 may include any number of ARFNs 102 (e.g., two ARFNs 102), such as a first ARFN 102(1) that includes one or more light emitters 106(1) and one or more light sensors 108(1), and a second ARFN 102(2) that includes one or more light emitters 106(2) and one or more light sensors 108(2). In addition, the scene 502 may include one or more objects, such as object 504 (a chair), which includes a netted surface 506 on the back of the chair 504. The system 500 may also include object 508, which is represented as a baseball.

For instance, assume that the first ARFN 102(1) is located at one end of the scene 502 (e.g., a room) and within the scene 502 is a chair (object 504) having a netted surface/backing 506. Further assume that there is a tennis ball (object 508) behind the chair 504 (e.g., on the other side of the netted chair with respect to the first ARFN 102(1)) and that the second ARFN 102(2) is placed at or near the location of the netted surface 506 of the chair 504. In this embodiment, the second ARFN 102(2) and the netted surface 506 of the chair 504 may be located in the same plane, such that the second ARFN 102(2) and the netted surface 506 of the chair 504 are each the same distance, or approximately the same distance, from the first ARFN 102(1). As a result of this room configuration, the first ARFN 102(1) may detect, and determine the depth of the chair 504 and the tennis ball 508, while the second ARFN 102(2) may prevent the first ARFN 102(1) from detecting the netted surface 506 of the chair 504.

In particular, the first ARFN 102(1) may emit a modulated signal for the purpose of detecting and determining the depth of objects within the scene 502, possibly utilizing TOF techniques. The modulated light may hit the netted surface 506 of the chair 504, along with the tennis ball 508 on the other side of the chair 504. The second ARFN 102(2) located in the same plane as the netted surface 506 of the chair 504 may capture the modulated light and then emit a second modulated signal back towards the first ARFN 102(1), where the second modulated signal has a phase that is offset one-hundred and eighty degrees from the phase of the modulated signal emitted by the first ARFN 102(1). For instance, although the frequency/amplitude of the modulated signal and the second modulated signal may be the same, the phase of the second modulated light signal may be complementary to the phase of the modulated signal. As a result of the second modulated signal being emitted by the second ARFN 102(2), the phase difference determined by the first ARFN 102(1) may be zero, which may prevent the first ARFN 102(1) from detecting the netted surface 506 of the chair 504. However, the first ARFN 102(1) may nonetheless detect the presence of other objects within the environment 502, such as the chair 504, with the exception of its netted surface 506, and the baseball 508.

Therefore, the first ARFN 102(1) may detect, and determine the location of, the chair 504 and the tennis ball 508, while being unable to detect the presence of the netted surface 506 of the chair 504. That is, the first ARFN 102(1) may capture the reflection of the modulated signal from the chair 504 and the tennis ball 508, but not from the netted surface 506 of the chair 504, thereby allowing the first ARFN 102(1) to determine the depth of the tennis ball 508 and the chair 504. However, the chair 504 will appear as not having the netted surface 506, although the chair 504 physically includes the netted surface 506. Moreover, since the depth of the chair 504 can be determined, the netted surface 506 of the chair 504 may be replaced with a different image that is not actually present within the room (e.g., a solid backing).

As stated above, in order to conceal the presence of an object from the first ARFN 102(1), the second ARFN 102(2) may be positioned in the same plane as that object, such that the second ARFN 102(2) and that object are each approximately the same distance from the first ARFN 102(1). However, in other embodiments, the second ARFN 102(2) need not be located in the same plane as the object to be concealed. For example, the second ARFN 102(2) may be positioned in front of or behind the object such that the object is located between the first ARFN 102(1) and the second ARFN 102(2) or is located on one side of both the first ARFN 102(1) and the second ARFN 102(2). In response to the first ARFN 102(1) emitting a modulated signal, the second ARFN 102(2) may first determine the location of the object using TOF techniques described herein. The second ARFN 102(2) may then consider and take into account the location of the object when determining the second modulated signal that is to be emitted towards the first ARFN 102(1).

In particular, the second ARFN 102(2) may consider the distance between the object and the second ARFN 102(2) when determining the phase of the second modulated signal, which may be offset one-hundred and eighty degrees from the phase of the modulated signal emitted by the first ARFN 102(1). Since the phase of the modulated signal at the location of the object may be different from the phase of the modulated signal at the location of the second ARFN 102(2), the second ARFN 102(2) may determine the phase of the second modulated signal based on the difference between the phases. Accordingly, the second ARFN 102(2) may be placed in various locations within the scene 502 provided that the distance between the object and the second ARFN 102(2) is considered when determining the phase of the second modulated signal.

Figure 6A:
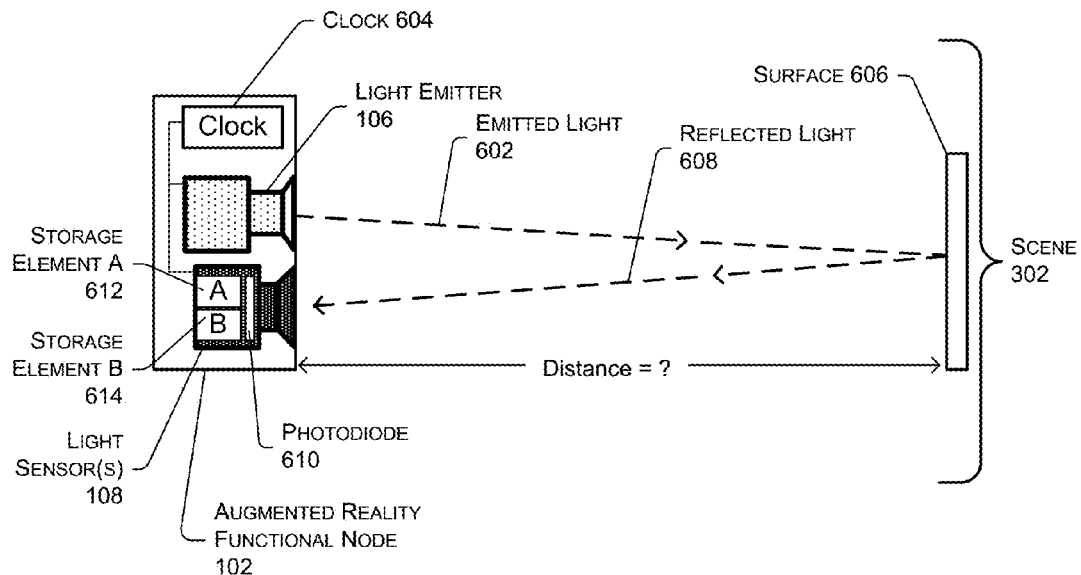
FIGS. 6A and 6B illustrate techniques to perform TOF calculations by capturing light emitted by a light emitter and reflected off a surface. The captured light is used to determine a distance from the surface.
Figure 6B:
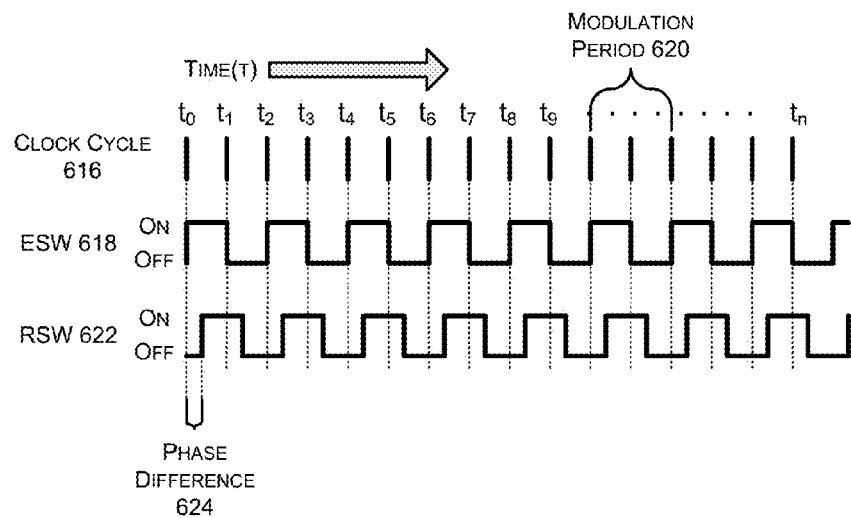

FIGS. 6A and 6B illustrate techniques to perform TOF calculations by capturing light emitted by a light emitter 106 and reflected off a surface or received from another source (a different ARFN 102). The captured light is used to determine a distance from the surface or the ARFN 102 that emitted the light that was captured.

FIG. 6A shows the light emitter 106 that emits light (emitted light 602) projected in a direction toward the scene 302. The emitted light 602 is generated by pulsing light on and off by the light emitter 106 based on a clock cycle from a clock 604. The pulses of light may be represented by a square wave, which is shown and discussed with reference to FIG. 6B. However, other pulses patterns may be employed that do not include equal lengths of time (e.g., emit light for 0.25 µs every 1 µs, etc.) Meanwhile, the emitted light 602 may be reflected off a surface 606, such as off an object, a person, clothing, tools, and so forth. Reflected light 608 may travel back toward the light sensor(s) 108.

However, in other embodiments, the emitted light 602 emitted by the light emitter 106 (of a first ARFN 102(1)) may be captured or sensed by a light emitter 106 of a second ARFN 102(2). Prior to the first ARFN 102(1) emitting the emitted light 602, the first ARFN 102(1) and the second ARFN 102(2) may be calibrated and, therefore, synchronized. That is, the position and/or orientation of each ARFN 102 may be known by the other ARFN 102, and the ARFNs 102 may be communicatively coupled via a network. As a result, the second ARFN 102(2) may know when the emitted light 602 is emitted by the light emitter 106 of the first ARFN 102(1), and may also know the frequency and/or the phase of the emitted light 602. In other embodiments, upon receiving the emitted light 602 emitted by the first ARFN 102(1), the second ARFN 102(2) may process the emitted light 602 to determine the frequency and/or phase of the emitted light 602. Based on the phase of the emitted light 602, the light emitter 106 of the second ARFN 102(2) may emit, towards the first ARFN 102(1), light having the same frequency/amplitude, but having a phase that is different, and offset from, that of the emitted light 602 emitted by the light emitter 106 of the first ARFN 102(1). The phase of the light emitted by the second ARFN 102(2) may be offset one-hundred and eighty degrees from the phase of the emitted light 602. The light sensor 108 of the first ARFN 102(1) may then determine the phase difference between emitted light 602 and the light emitted by the second ARFN 102, as described above and as set forth below. Provided that the phases are offset one-hundred and eighty degrees, the phase difference may be determined to be zero.

In accordance with one or more embodiments, the light sensor(s) 108 may include a photodiode 610, a storage element A 612 and a storage element B 614. In these embodiments, the photodiode 610 may be shared by multiple storage elements. However, some configurations may include a separate photodiode 610 for each storage element. For the sake of the following discussion (and through this document), either configuration may be used. The storage element A 612 and storage element B 614 may store energy from the reflected light 608 captured by the photodiode 610 at different intervals of time. For example, the storage element A 612 may cycle on at a first time and off at a second time while the storage element B 614 may cycle off at the first time and on at the second time in opposite alternation (inverse synchronization) with the storage element A 612. In some embodiments, additional storage elements may be used in addition to the storage element A 612 and the storage element B 614, which may store energy from light at different intervals and/or overlapping intervals. The storage element A 612 and storage element B 614 may be capacitors or other hardware used to store energy converted from light. At some points, the discussion below may refer to a capture of light from different light sensors 108, however, it shall be understood that a light sensor 108 with a shared photodiode 610 can capture different time intervals of light using multiple storage elements, and thus may perform the function of multiple sensors.

FIG. 6B shows a clock cycle 616 plotted with respect to time (t). The clock cycle 616 may be generated by the clock 604 and include equal segments of time based on a predetermined frequency. In addition, FIG. 6B shows an emitter square wave (ESW) 618 that represents a graph of the pulsing of light by the light emitter 106 between an on-state of operation and an off-state of operation. Although the various waves discussed herein are referred to as square waves, other types of waveforms may be employed to accomplish the same or similar results. In various embodiments, the on-state and the off-state may be equal in length of time and synchronized with the clock cycle 616. For example, the light emitter 106 may emit light for x clock cycles 616 and then be off for x clock cycles 616 until emitting light again for x clock cycles 616, and so forth. A modulation period 620 is defined by each complete cycle of the light emitter 106 operating the on-state and the off-state once. In the example above, the modulation period 620 is 2x.

FIG. 6B also shows a received square wave (RSW) 622 that represents a graph of the received pulses of the reflected light 608 as captured (stored, measured) by the light sensor 108. In other embodiments, the RSW 622 may correspond to pulses of light emitted by a light emitter 106 of a second ARFN 102(2) within the environment. The RSW 622 shows when light is received (on) or not received (off), which is a function of the pulses of light generated by the light emitter 106. Unlike the ESW 618, the RSW 622 may not be synchronized with the clock cycle 616. A difference in the timing of the transitions of light (e.g., pulses) and the clock cycle 616 is equal to a phase difference 624, which is shown in FIG. 6B, and dependent on a distance of travel of the reflected light 608. The phase difference 624 may be used to determine a distance between the first ARFN 102(1) and the surface 606, or between the first ARFN 102(1) and the light emitter 106 of the second ARFN 102(2).

Figure 7:
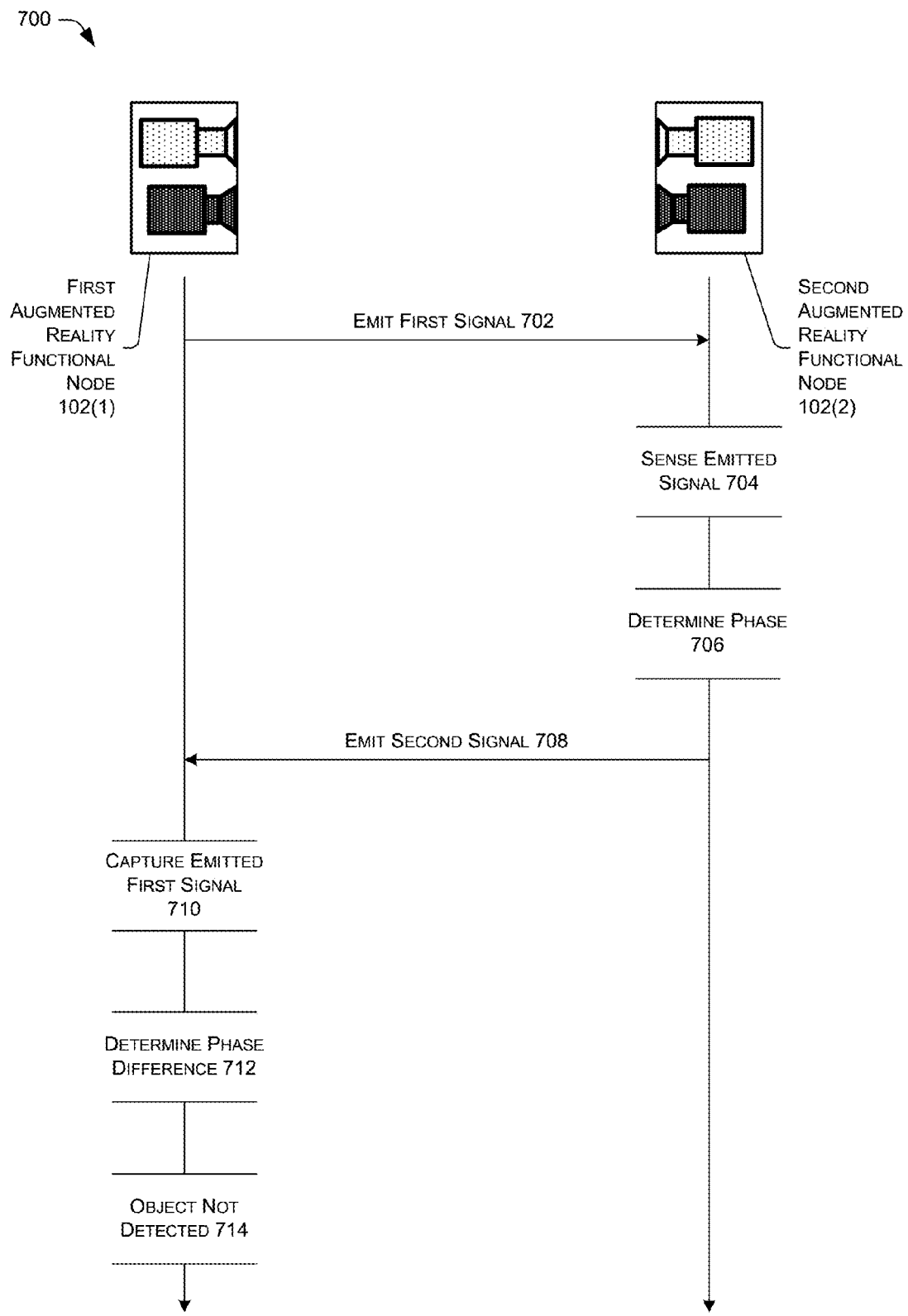
FIG. 7 is an illustrative diagram of multiple ARFNs within an environment, where one of the ARFNs may prevent the other ARFN from detecting the presence and depth of an object within the environment.

FIG. 7 illustrates a system 700 for preventing the detection of one or more objects within an environment with respect to a particular ARFN 102. As shown, FIG. 7 may include a first ARFN 102(1) and a second ARFN 102(2), which may each include one or more light emitters 106 and one or more light sensors 108. For the purpose of this discussion, the first ARFN 102(1) and the second ARFN 102(2) may be identical, similar, or different.

Initially, the first ARFN 102(1) and the second ARFN 102(2) may be calibrated and/or synchronized with respect to one another. That is, the multiple ARFNs 102 within the environment may be calibrated and/or synchronized such that each ARFN 102 is are aware of the location and/or the orientation of the other ARFNs 102 within the environment. The ARFNs 102 may be calibrated and/or synchronized so that light emitted by the light emitter 106 of one of the ARFNs 102 is to be captured by the light sensor 108 of the other ARFN 102, and vice versa. The ARFNs 102 are also calibrated and/or synchronized so that the phase, amplitude and/or frequency of light emitted by either ARFN 102 is known, or can be determined, by other ARFNs 102 within the environment. As a result, an ARFN 102 that captures emitted light will be able to emit a modulated signal that has a phase that is one-hundred and eighty degrees offset from the phase of the emitted light. Since the resulting phase difference between the emitted light and the modulated signal will be zero, the ARFN 102 that emitted the emitted light will be unable to detect the presence of objects in the same plane as the ARFN that emitted the modulated signal, thereby causing the modulated signal to effectively cancel the emitted light.

Although any number of ARFNs 102 may be calibrated and/or synchronized, in order to calibrate two ARFNs 102 within an environment, each of the ARFNs 102 may emit a light signal and then it may be determined whether the other ARFN 102 captured that light signal. If so, the two ARFNs 102 may be considered calibrated and/or synchronized. However, if not, further calibration may be performed to synchronize the two ARFNs 102.

Provided that the first ARFN 102(1) and the second ARFN 102(2) within the environment are calibrated and/or synchronized, the light emitter 106 of the first ARFN 102(1) may emit a signal 702, which may also be referred to as light, a light signal, modulated light, a modulated signal, or pulses of light. The emitted signal 702 may be emitted into the environment for the purpose of detecting, identifying, and/or determining the location/depth of objects within the environment (e.g., walls, furniture, people, etc.). If one desires to conceal the presence and location of a particular object within the environment, the second ARFN 102(2) may be positioned in close proximity to (i.e., the same plane as) that object. As a result, when the emitted signal 702 is emitted by the first ARFN 102(1), the light sensor 108 of the second ARFN 102(2) (e.g., a complementary metal-oxide-semiconductor (CMOS) sensor) may sense or capture the emitted signal 704. Using the techniques described above, the second ARFN 102(2) may then determine the phase 706, frequency, amplitude, etc. of the emitted signal 702.

Based at least in part on the determined phase 706 of the first signal 702, the second ARFN 102(2) may emit a second signal 708 directed towards the first ARFN 102(1). That is, the light emitter 106 of the second ARFN 102(2) may emit a second modulated light signal 708 having a phase that is different from that of the signal 702 emitted by the first ARFN 102(1). In some embodiments, the second modulated light signal 708 may have a phase that is offset one-hundred and eighty degrees from the phase of the emitted first signal 702. For the purposes of this discussion, a phase shift may correspond to a change that occurs in the phase of a single modulated signal, or in the phase difference between two modulated signals. The second ARFN 102(2) may select the phase 706 of the second signal 708 such that the resulting phase difference measured by the first ARFN 102(1) is zero. That is, since the second signal 708 may have a phase that is one-hundred and eighty degrees offset with respect to the phase of the first signal 702, thereby causing the resulting phase difference to be zero, the second signal 708 may effectively cancel the first signal 702. As a result, the first ARFN 102(1) may be unable to detect the presence of an object that is in the same plane as the second ARFN 102(2).

Moreover, two modulated signals that have the same frequency but have no phase difference are said to be "in phase". That is, the second ARFN 102(1) may cause the phase difference to be zero, which may cause the modulated signals to be in phase. On the contrary, two modulated signals that have the same frequency but have different phases have a phase difference, and are "out of phase" or "offset" with respect to one another.

Upon the second ARFN 102(2) emitting the second signal 708, the first ARFN 102(1) may capture the emitted second signal 710. The first ARFN 102(1) may then determine the phase difference 712 with respect to the first signal 702 emitted by the first ARFN 102(1) and the second signal 708 emitted by the second ARFN 102(2). That is, the phase difference 712 determined by the first ARFN 102(1) may be based on the second signal 708 emitted by the second ARFN 102(2), as opposed to a reflected signal that reflected off the object back towards the first ARFN 102(1).

As stated above, due to the second ARFN 102(2) emitting a second signal 708 having a phase that is offset one-hundred and eighty degrees with respect to the phase of the emitted first signal 702, the phase difference 712 determined by the first ARFN 102(1) may be zero. As a result, the first ARFN 102(1) may be unable to detect the presence and location of the object (e.g., object not detected 714), which is in the same plane as the second ARFN 102(2), but may be able to detect the presence and location of other objects within the environment. Accordingly, by placing a second ARFN 102(2) at or near the location of (i.e., in the same plane as) an object that one does not want to detect (e.g., a cup on top of a table), the second ARFN 102(2) may prevent a different ARFN 102 from being able to detect the presence and location of that object.

As an example, assume that one would like to determine the depth of objects through a partially reflective surface, such as a glass window or a netted insect screen. In this instance, one may want to detect and determine the depth of an object through the partially reflective surface, without detecting the partially reflective surface itself. To do so, a second ARFN 102 may be positioned at or near the location of the partially reflective surface, such as in the same plane as the partially reflective surface. Utilizing the process described with respect to FIG. 7, an ARFN 102 may determine the depth of an object (e.g., a tennis ball) through the partially reflective surface (e.g., a glass window), without detecting the partially reflective surface. As a result, the partially reflective surface may be invisible with respect to that ARFN 102, although the partially reflective surface is physically within the field of view of the ARFN 102.

The processes described above may also be utilized to insert virtual objects into a scene, such as an animated environment (e.g., a television program, a movie, etc.). By adding an ARFN 102 at a particular location within the scene, one may know the exact location of that ARFN 102. Then, by using the process illustrated in FIG. 7, the system may insert a virtual object at the particular location of the ARFN 102 within the scene, without having to use a powerful graphics processor or other processing operations. For instance, assume that one would like to insert an object at a particular depth (in real-time or near real-time) within an animated environment without having to perform any additional processing. In particular, provided that there is a desk within the animated environment, one may want to place an object (e.g., a cup) on the desk at that particular depth. By placing a second ARFN 102 at the particular depth/location of the table, the desk may appear to have a cup on top of the table.

In other embodiments, the process illustrated in FIG. 7 may be utilized to reduce interference between multiple devices (having TOF functionality) within the same environment. The interference may be a result of the multiple devices each emitting modulated light signals within the environment, and attempting to determine the depth of other objects/devices within the environment. Due to the interference, the depth of devices may prove to be incorrect. To reduce the amount of interference, when a device senses a modulated signal from another device, the device may emit a modulated signal having a different or adjusted phase (i.e., offset one-hundred and eighty degrees), thereby canceling the emitted modulated signal. As a result, that device may then determine the depth of objects within the environment utilizing TOF.

Figure 8:
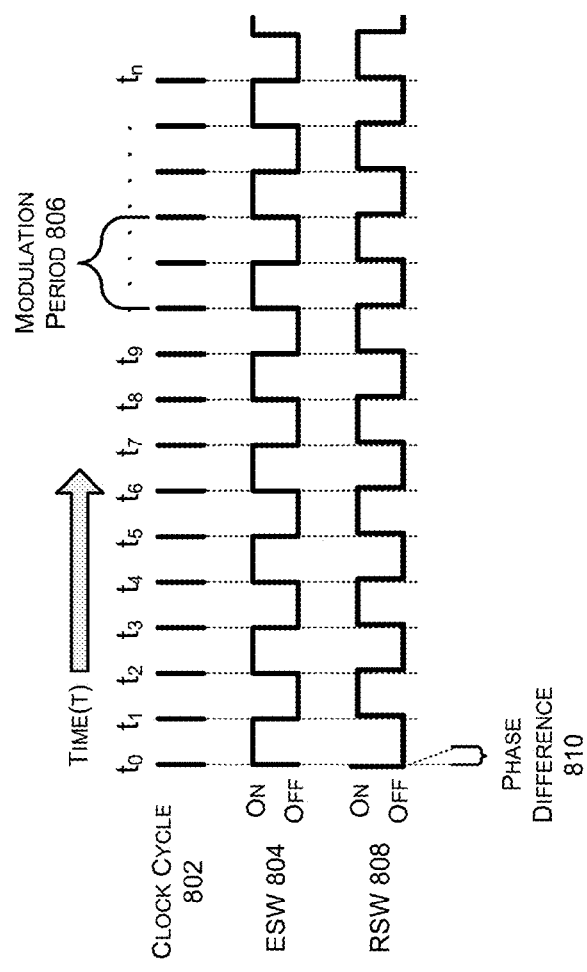
FIG. 8 illustrates techniques to for a first device within an environment to capture a modulated signal from a second device within the environment and then emit a second, different modulated signal towards the second device.

FIG. 8 illustrates a technique to perform TOF calculations by capturing light emitted by a light emitter 106 from another source (a different ARFN 102). The captured light is used to determine a distance from the ARFN 102 that emitted the captured light.

As described above with respect to FIG. 7, a first ARFN 102(1) may attempt to detect, and determine the depth of, objects within an environment. However, one may want certain areas or objects within the environment to appear invisible to the first ARFN 102(1). To do so, the second ARFN 102(2) may be located at or in close proximity to (i.e., in the same plane as) that area/object. Accordingly, when the first ARFN 102(1) emits modulated light within the environment, the second ARFN 102(2) may capture that modulated light and emit modulated light having an offset or adjusted phase, such as having a phase that is offset one-hundred and eighty degrees from the phase of the initially emitted modulated light. Upon capturing the modulated light emitted by the second ARFN 102(2), the first ARFN 102(1) may determine the phase difference associated with modulated light emitted by the first ARFN 102(1) and the modulated light captured by the first ARFN 102(1). Due to the offset or adjusted phase of the modulated light emitted by the second ARFN 102(2), the determined phase difference may be zero, which may result in a phase difference of zero and which may cause the first ARFN 102(1) to be unable to detect the area/object in close proximity to the second ARFN 102(2).

The diagram 800 illustrated in FIG. 8 is similar to that illustrated in FIG. 6B. In particular, the diagram 800 includes a clock cycle 802, an emitter square wave (ESW) 804, a modulation period 806, a received square wave (RSW) 808, and a phase difference 810. Moreover, FIG. 8 illustrates the clock cycle 802 plotted with respect to time (t). The clock cycle 802 may be generated by the clock 604 and include equal segments of time based on a predetermined frequency. In addition, the ESW 804 may represent a graph of signals being emitted by the light emitter 106 of the first ARFN 102(1) between an on-state of operation and an off-state of operation. As discussed above, although the various waves discussed herein are referred to as square waves, other types of waveforms may be employed to accomplish the same or similar results. The modulation period 806 may be defined by each complete cycle of the light emitter 106 of the first ARFN 102(1) operating the on-state and the off-state once.

Furthermore, the RSW 808 may represent a graph of the received modulated light emitted by the second ARFN 102(2), as captured (stored, measured) by the light sensor 108 of the first ARFN 102(1). The RSW 808 shows when light is received (on) or not received (off). As discussed above, the amplitude and/or frequency of the RSW 808, which may be referred to the modulated light emitted by the second ARFN 102(2), may be the same as that of the ESW 804, which may correspond to the modulated light emitted by the first ARFN 102(1). A difference in the timing of the transitions of light (e.g., pulses) and the clock cycle is equal to the phase difference 810, which may be dependent on a distance of travel of the light emitted by the second ARFN 102(2). The phase difference 810 may be used to determine a distance between the first ARFN 102(1) and the light emitter 106 of the second ARFN 102(2). Since the second ARFN 102(2) is positioned in the same location as (i.e., the same plane as) the object, the phase difference 810 may be used to determine a distance between the first ARFN 102(1) and the object. Here, FIG. 8 shows that the phase of the ESW 804 is different from the phase of the RSW 808, which indicates that the two modulated signals are "in phase." In particular, the phases of the ESW 804 and the RSW 808 are offset one-hundred and eighty degrees, which causes the phase difference 810 to be zero. Due to the ESW 804 and the RSW 808 being in phase, the RSW 808 cancels the ESW 804 and, as a result, the first ARFN 102(1) may be unable to detect the presence of the object. Accordingly, although the object is physically present within the environment, the object may appear invisible to the first ARFN 102(1).

Figure 9:
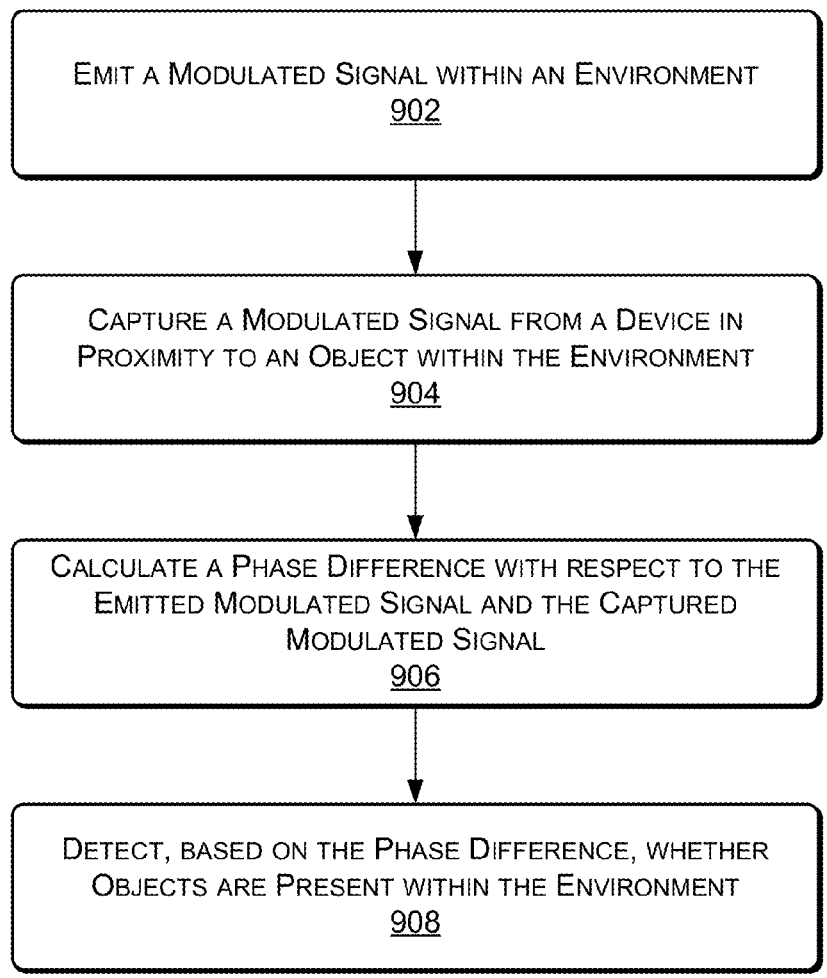
FIG. 9 is a flow diagram of an illustrative process to determine whether one or more objects are located within an environment.
Figure 10:
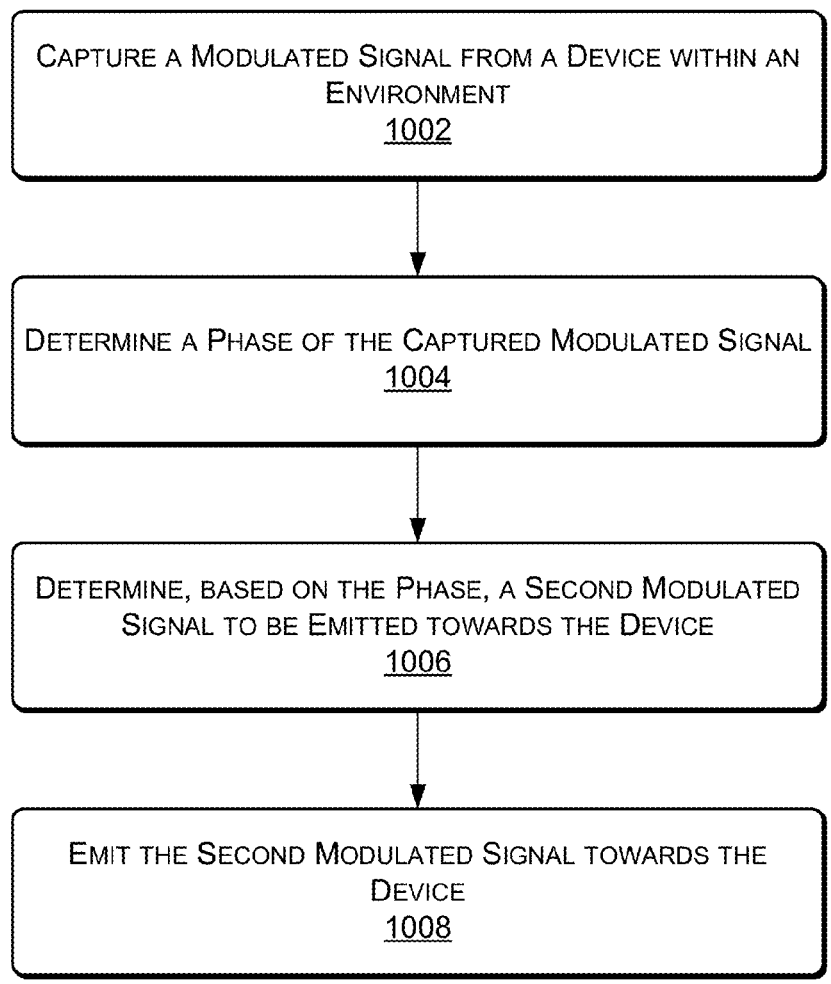
FIG. 10 is a flow diagram of an illustrative process to prevent a device from detecting one or more objects within an environment.

FIGS. 9 and 10 are flow diagrams of illustrative processes for detecting objects within an environment. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 9 is a flow diagram illustrating an example process 900 of detecting, and determining the depth of, objects within an environment using TOF. Moreover, the following actions described with respect to FIG. 9 may be performed by an ARFN 102, and in particular, the first ARFN 102(1) illustrated in FIG. 7.

Block 902 illustrates emitting a modulated signal within an environment. In various embodiments, an ARFN 102 (e.g., the first ARFN 102(1)) may attempt to detect objects within an environment, while also determining the depth of those objects. To do so, the first ARFN 102(1) may emit a modulated signal (e.g., light signals) within the environment and then capture reflected light that has reflected off of objects within the environment. The phase difference corresponding to the emitted light and the sensed reflected light may then be determined using TOF. Utilizing the phase difference the first ARFN 102(1) may determine the depth of that object.

Block 904 illustrates capturing a modulated signal from a device in proximity to an object within the environment. In some embodiments, a second ARFN 102(2) may be positioned in close proximity to an object within the environment, meaning that the second ARFN 102(2) may be physically located in the same plane as the object. In response to capturing the modulated signal emitted by the first ARFN 102(1), the second ARFN 102(2) may emit a second modulated signal having a phase that is offset, shifted, and/or different from that of the emitted modulated signal. For instance, the second modulated signal may have a phase that is offset one-hundred and eighty degrees from the phase of the modulated signal. A light sensor 108 of the first ARFN 102(1) may then capture the second modulated signal emitted by the second ARFN 102(2).

Block 906 illustrates calculating a phase difference with respect to the emitted modulated signal and the captured modulated signal. Based on the modulated signal emitted by the first ARFN 102(1) and a receipt of the second modulated signal emitted by the second ARFN 102(2), the first ARFN 102(1) may determine a phase difference using TOF techniques.

Block 908 illustrates detecting, based on the phase difference, whether objects are present within the environment. In particular, utilizing the phase difference, the first ARFN 102(1) may detect, and determine the depth of, the object. However, due to the second ARFN 102(2) emitting the second modulated signal having an offset phase that is complementary to the phase of the emitted modulated signal (i.e., shifted one-hundred and eighty degrees from the phase of the emitted modulated signal), the phase difference determined by the first ARFN 102(1) may be zero. As a result, the first ARFN 102(1) may be unable to detect the presence of that particular object. Accordingly, by manipulating the position of the second ARFN 102(2), one may cause certain objects within the environment to appear invisible to the first ARFN 102(1).

FIG. 10 is a flow diagram illustrating an example process 1000 of utilizing a second ARFN to conceal objects within an environment. Moreover, the following actions described with respect to FIG. 10 may be performed by an ARFN 102, and in particular, the second ARFN 102(2) illustrated in FIG. 7.

Block 1002 illustrates capturing a modulated signal from a device within an environment. In various embodiments, the second ARFN 102(2) may sense or capture a modulated signal emitted by a first ARFN 102(1) that is also within the environment. In these embodiments, the second ARFN 102(2) is located in close proximity to (i.e., in the same plane as) a particular object within the environment.

Block 1004 illustrates determining a phase associated with the captured modulated signal. In response to capturing the modulated signal, the second ARFN 102(2) may determine the frequency/amplitude of the modulated signal emitted by the first ARFN 102(1) and a phase corresponding to that modulated signal. In other embodiments, the frequency and/or phase of the captured modulated signal may be known by the second ARFN 102(2) prior to the first ARFN 102(1) emitting the modulated signal.

Block 1006 illustrates determining, based on the phase, a second modulated signal to be emitted towards the device. In particular, based on the phase, the second ARFN 102(2) may determine a second modulated signal that has a phase that is different from (e.g., shifted phase, etc.) that of the modulated signal emitted by the first ARFN 102(1), such as the phase of the second modulated signal being offset one-hundred and eighty degrees from the phase of the modulated signal. As a result, the second modulated signal emitted by the second ARFN 102(2) may cancel the modulated signal emitted by the first ARFN 102(1).

Block 1008 illustrates emitting the second modulated signal towards the device. By emitting the second modulated signal to the first ARFN 102(1), which is sensed by the first ARFN 102(1), the phase difference determined by the first ARFN 102(1) may be zero. Thus, the first ARFN 102(1) may be unable to detect the presence of the object that is in close proximity to (i.e., is in the same plane as) the second ARFN 102(2).

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a first time-of-flight (TOF) device within an environment; and
a second TOF device being positioned in a same plane as a first object within the environment, the system configured to perform operations comprising:
emitting, by the first TOF device, a first light signal having a frequency and a first phase;
receiving, by the second TOF device, at least a portion of the first light signal;
emitting, by the second TOF device and towards the first TOF device, a second light signal having the frequency and a second phase that is offset one-hundred and eighty degrees from the first phase of the first light signal;
receiving, by the first TOF device, a portion of the second light signal; and
calculating, by the first TOF device and based at least partly on the first phase and the second phase, that a phase difference between the first light signal and the second light signal is zero, such that the second light signal cancels the first light signal causing the first TOF device to be unable to detect presence of the first object.

2. The system as recited in claim 1, wherein, prior to the first light signal being emitted by the first TOF device, the first TOF device and the second TOF device are synchronized such that the frequency of the first light signal, the first phase of the first light signal, and a distance between the first TOF device and the second TOF device are stored by the second TOF device.

3. The system as recited in claim 1, wherein the operations further comprise:
prior to emitting the second light signal, determining, by the second TOF device, a distance between the first TOF device and the second TOF device, the distance between the first TOF device and the second TOF device being determined based at least partly on a phase difference between a third light signal emitted by the second TOF device and a fourth light signal resulting from the third light signal reflecting off the first TOF device; and
determining, by the second TOF device, the second phase of the second light signal based at least partly on the first phase of the first light signal and the distance between the first TOF device and the second TOF device.

4. The system as recited in claim 1, wherein the first signal is used by the first TOF device to detect, and determine a depth of, a second object within the environment, wherein the second object is at least partially obscured by the first object.

5. A method comprising:
emitting, by a first device, a first modulated signal having a frequency and a first phase;
receiving, by the first device, a second modulated signal having the frequency and a second phase that is offset with respect to the first phase, the second modulated signal being emitted by a second device; and
determining, by the first device and based at least partly on the first phase and the second phase, a phase difference between the first modulated signal and the second modulated signal causing an object that is physically separate from the second device to be undetectable by the first device.

6. The method as recited in claim 5, wherein determining the phase difference between the first modulated signal and the second modulated signal includes determining that the phase difference between the first modulated signal and the second modulated signal is zero.

7. The method as recited in claim 5, wherein the second phase is offset one-hundred and eighty degrees from the first phase.

8. The method as recited in claim 5, wherein the second device is located in a same plane as the object, such that a first distance between the first device and the object is equal to a second distance between the first device and the second device.

9. The method as recited in claim 5, wherein the object is located between the first device and the second device, and wherein the second phase is determined based at least partly on a distance between the second device and the object.

10. The method as recited in claim 5, wherein the second modulated signal is emitted in response to determining the first phase of the first modulated signal.

11. The method as recited in claim 5, wherein the second phase of the second modulated signal is determined based at least partly on the first phase of the first modulated signal and a distance between the first device and the second device.

12. The method as recited in claim 11, wherein, prior to the first modulated signal being emitted by the first device, the first device and the second device are synchronized such that the frequency of the first modulated signal, the first phase of the first modulated signal, and a distance between the first device and the second device are stored by at least one of the first device or the second device.

13. The method as recited in claim 5, further comprising determining, based at least partly on the first modulated signal, a depth of one or more objects that are not in the same plane as the second device.

14. A method comprising:
receiving, by a first device, a first modulated signal having a frequency, the first modulated signal being emitted by a second device;
determining, by the first device, a first phase of the first modulated signal;
determining, by the first device and based at least partly on the first phase, a second phase that is offset with respect to the first phase; and
emitting, by the first device and directed towards the second device, a second modulated signal having the frequency and the second phase, the second modulated signal causing a first object that is physically separate from the first device to be undetectable by the second device.

15. The method as recited in claim 14, wherein the first device and the first object are located in a same plane, such that a first distance between the first device and the second device and a second distance between the first object and the second device are approximately equal.

16. The method as recited in claim 14, wherein a phase difference between the first modulated signal and the second modulated signal is determined to be zero.

17. The method as recited in claim 14, wherein the second phase is offset one-hundred and eighty degrees from the first phase.

18. The method as recited in claim 14, wherein, prior to the first modulated signal being emitted by the second device, the first device and the second device are synchronized such that the frequency of the first modulated signal, the first phase of the first modulated signal, and a distance between the first device and the second device are stored by the first device.

19. The method as recited in claim 14, wherein the first modulated signal is used by the second device to detect, and determine a depth of, a second object, wherein the second object is at least partially obscured by the first object.

20. The method as recited in claim 14, wherein the first object is located between the first device and the second device, and wherein the second phase is determined based at least partly on a distance between the first device and the first object.

* * * * *